United States Patent [19]

Stracke et al.

[11] Patent Number: 5,639,297

[45] Date of Patent: Jun. 17, 1997

[54] METHOD OF MAKING AN IMPROVED PAVEMENT

[76] Inventors: Markus Stracke, Himmelpfortgasse 11/23, 1010 Wien, Austria; Lothar Kaden, Am Vögl 13, 01689 Weinböhla, Germany

[21] Appl. No.: 398,956

[22] Filed: Mar. 2, 1995

[51] Int. Cl.⁶ .................................................. C04B 38/08
[52] U.S. Cl. ........................................ 106/677; 106/724
[58] Field of Search ................................ 106/677, 724; 427/397.7, 215; 428/404

[56] References Cited

U.S. PATENT DOCUMENTS 4,104,077   8/1978   Kobayashi et al. ................. 106/672

FOREIGN PATENT DOCUMENTS

| | | | |
|---|---|---|---|
| 2312582 | 9/1974 | Germany | 106/677 |
| 2351469 | 4/1975 | Germany | 106/677 |
| 47-28683 | 7/1972 | Japan | 106/677 |
| 51-38313 | 3/1976 | Japan | 106/677 |
| 58-64291 | 4/1983 | Japan | 106/677 |
| 60-161381 | 8/1985 | Japan | 106/677 |
| 5-194057 | 8/1993 | Japan . | |
| 288623 | 12/1970 | U.S.S.R. | 106/677 |
| 668912 | 6/1979 | U.S.S.R. | 106/677 |
| 2100244 | 12/1982 | United Kingdom | 106/677 |

*Primary Examiner*—Anthony Green
*Attorney, Agent, or Firm*—Henry M. Feiereisen

[57] ABSTRACT

A method of making a pavement by installing a heat insulating course of lightweight concrete of low thermal conductivity includes crushing polystyrene foam, especially polystyrene foam waste, or by foaming particulate polystyrene to form particulate polystyrene foam which is then subjected to a rapid heating process. The heat-treated particles of polystyrene foam are blended with a cement paste comprised of cement and water to form a mixture which is then allowed to harden.

17 Claims, 1 Drawing Sheet

METHOD OF MAKING AN IMPROVED PAVEMENT

BACKGROUND OF THE INVENTION

The present invention refers to a method of making a pavement, and in particular to a method of substantially reducing a frost-based slickness or ice formation on road surfaces in street crossings or in the area of bridges.

It is generally known to heat the pavement during cold spells by electric heating units which are installed underneath the road surface. A main drawback of this proposal is the insufficient heat insulation of the road subbase, resulting in a major part of the heat energy being wasted through propagation to the subbase, and thus in a substantial energy consumption. On the other hand, suitable heat insulants which would meet the requirements with regard to load-carrying capability, frost resistance, elastic behavior, water permeability, water reception and cost efficiency have not been found yet.

SUMMARY OF THE INVENTION

It is an object of the present invention to provide an improved method of making a pavement obviating the afore-stated drawbacks.

In particular, it is an object of the present invention to provide an improved method which substantially reduces the formation of slick road surfaces and considerably enhances the road conditions, in particular during a cold spell.

These objects and others which will become apparent hereinafter are attained in accordance with the present invention by embedding a heating unit in form of conduit coils for passage of water or other suitable liquid within the wearing course of the pavement and installing between the subbase and the wearing course a heat insulating course of lightweight concrete at a layer thickness of about 10 to 20 cm.

Preferably, the heat insulating course of lightweight concrete is fabricated by crushing polystyrene refuse of polystyrene foam, or by foaming particulate polystyrene with the thermal conductivity of these polystyrene foams amounting to 0.035 W/mK, and subjecting these polystyrene foams to a thermal shock treatment so that the thermoplastic behavior of the foam particles, which have a size between 5-30 mm, causes a "vitrification" on their surfaces. Through melting on the surfaces of the thermoplastic polystyrene foams with combustion gases at 500°-800° C., the foam particles assume a "shell"-type configuration of sintered polystyrene plastic. This shell formation effects a multiplication of the initial strength of the particles so that lightweight concretes formed with such heat-treated polystyrene plastic have a much higher resistance to pressure compared to conventional foamed lightweight concretes of unheated aggregates.

Suitably, after being subjected to the thermal shock treatment, the heat-treated particulate polystyrene foam is mixed with a cement paste comprised of cement and water to form a mixture which is then allowed to harden. For example, the lightweight concrete according to the present invention can be made by blending 1,000 liters of sintered particulate foam with cement paste comprised of e.g. 250 kg cement and 110 liter water with addition of bond improving components. Alternatively, it is also possible to coat the heat-treated (or also unheated) particles at the production site with a thin cement paste coating to form a dry particle aggregate which is furnished to the construction site for binding with cement paste, possibly also in a rotary drum mixer.

The heat insulating course fabricated by a lightweight concrete according to the present invention forms an extremely efficient heat insulation and can withstand extremely high loads through heavy traffic. Moreover, the heat insulating course is frost resistant and of superior water permeability to prevent water absorption by single particles. A water absorption of single polystyrene foam particles is also essentially eliminated because the particle surfaces are sealed in correspondence to the vitrified thickness layer.

Suitably, the warm water conduit coils are embedded in a manner similar to floor heaters in the wearing course of the pavement, with the wearing course preferably made of a heat-conducting heavy concrete, preferably heat-conducting asphaltic material.

The particles of the heat-treated polystyrene foam are characterized by a high strength and thus require less cement paste for formation of the lightweight concrete and for meeting the required strength so that the fraction of large pores of the overall mixture can be considerably increased because large pores are not filled with large amounts of cement paste. Thus, the drainage of the subbase as required in road construction and bridge construction is ensured in an extremely high degree.

Moreover, the small amount of cement for formation of the cement paste for the lightweight concrete mixture improves the λ value i.e. the thermal conductivity. A lightweight concrete of this type has a thermal conductivity λ of about 0.08 W/mK at sufficient resistance to pressure. Moreover, the coarse pores of the heat-treated lightweight concrete will substantially prevent fines (less than 0.02 mm grain size) from being forced upwards by the "pumping motion" caused by heavyload traffic. If at all, no more than 3 volume percent of such fines will reach the top surface so that the frost resistance of the subbase of lightweight concrete according to the invention is ensured over a long period.

The improved method according to the invention thus allows formation of a subbase which is characterized by an optimum heat insulation to enable the supply of heating conduits—similar to floor heaters—with warm water of relatively low heat content in a very efficient manner. Normally, the desired "deicing effect" of the pavement is effected already with water temperatures of only 8°-12° C. at low flow rates such as e.g. 0.5 liter per second so long as the respective heating sections are of a size of 200 m².

The required warm water amounts could be branched off e.g. from neighboring long distance heating systems, or generated by solar heating systems which may be installed on roofs for warm water generation, or by systems which are based on geothermal recovery.

A further advantage of the heat insulating course according to the present invention is its capability to adapt to and compensate irregularities during installation upon the subbase. Thus, the drawbacks encountered in connection with installation of conventional rigid insulating plates, which results e.g. in the presence of unavoidable cavities underneath the plates, are avoided.

BRIEF DESCRIPTION OF THE DRAWING

The above and other objects, features and advantages of the present invention will now be described in more detail with reference to the accompanying drawing in which the sole

DETAILED DESCRIPTION OF PREFERRED EMBODIMENTS

Figure 1:
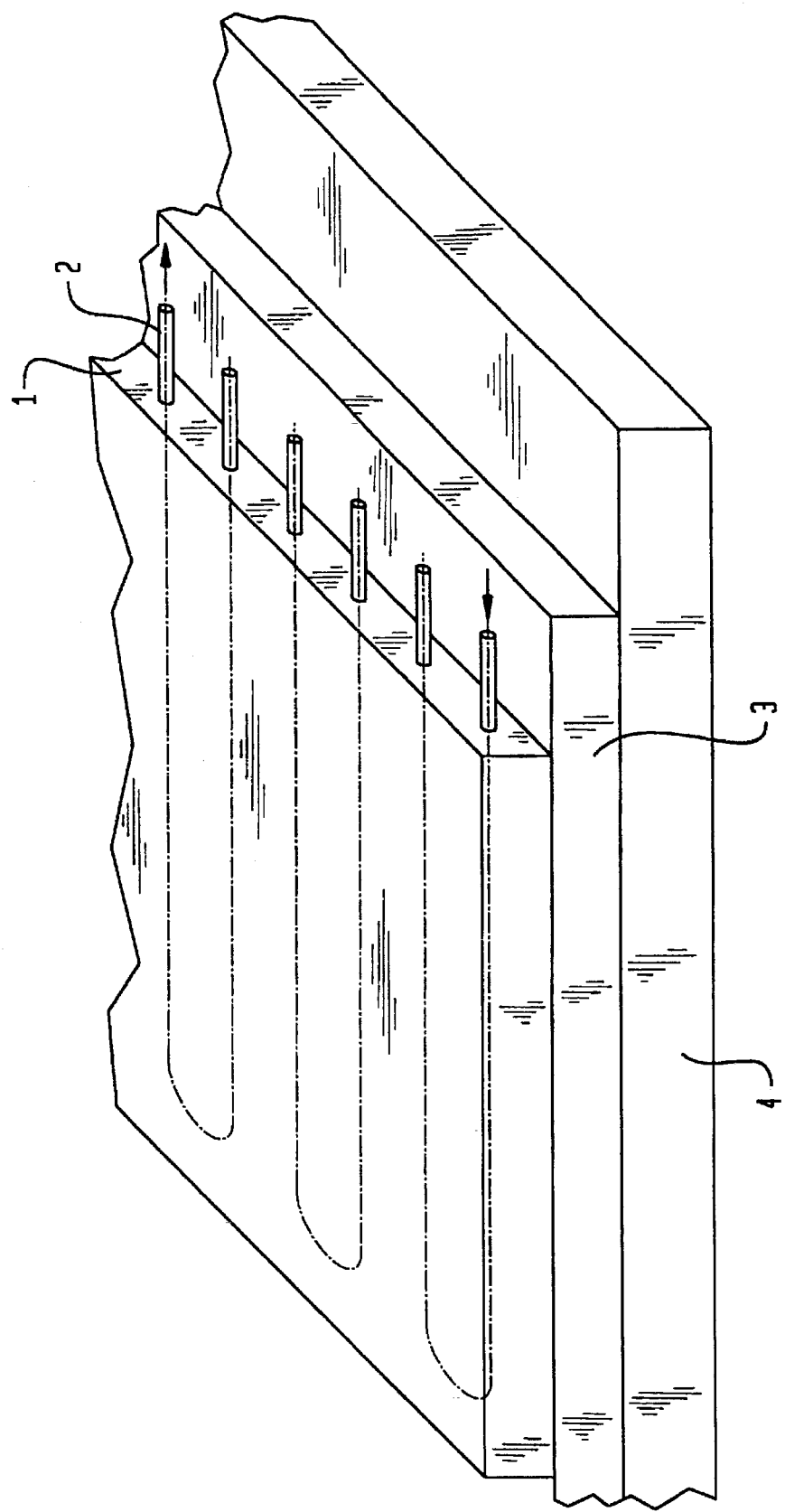
FIG. 1 shows a simplified perspective illustration of an exemplified pavement incorporating a heat insulating course in accordance with the present invention.

Referring now to FIG. 1, there is shown a simplified perspective illustration of a section of a pavement including a wearing course 1 which constitutes the top layer of the road and may be applied at a thickness of about 15 cm. Embedded in the wearing course 1 are a plurality of coiled conduits 2 for flow of warm water or other suitable heat carrier fluid. The wearing course 1 is made of good heat conducting heavy concrete or asphaltic material and is installed over a heat insulating course 3 fabricated of lightweight concrete at a thickness of about 10–20 cm, preferably 15 cm, and sandwiched between the wearing course 1 and a subbase 4 of coarse gravel which may be applied at a thickness of 20 cm.

In accordance with one embodiment of the invention, the heat insulating course 3 has a low thermal conductivity and is made by comminuting a polystyrene foam, especially polystyrene foam refuse or by foaming particulate polystyrene, and subjecting the particulate polystyrene foam to rapid heating (thermal shock treatment) preferably with combustion gases at a temperature of 500° C. 800° C. Thereafter, the heat-treated particles of polystyrene foam are mixed with cement and water, preferably at a ratio of 1,000 l: 250 kg: 110 l to form a cement paste which is then allowed to harden. Suitably, the polystyrene foam is comminuted or crushed to a particle size of a mean diameter between 5–30 mm.

In order to make the heat insulating course 3 suitable for transportation, the heat-treated polystyrene foam particles are coated with a thin cement paste coating at the production site to form a dry particle aggregate which is easy to transport to the construction site and can be mixed, even in rotary drum mixers, with cement paste to form a mixture which is then allowed to harden.

In accordance with a variation of the present invention, it is also possible to make a heat insulating course 3 of low thermal conductivity by omitting the heat-treating step and only coating the particulate polystyrene foam with a thin cement paste coating at the production site to form a dry particle aggregate. In a manner as described above, this dry particle aggregate can then be transported to the construction site and mixed with cement paste for making the lightweight concrete for the heat insulating course 3.

Warm water flowing through the coiled conduits 2 in the wearing course 1 can be supplied by any suitable means such as e.g. from long distance heating systems, solar heating systems or geothermal heating systems. Also, since the heat insulating course 3 of lightweight concrete based on heat-treated polystyrene foam has highly heat-insulating properties with a thermal conductivity λ of about 0.08 W/mK, the use of electric heating systems is possible for the relatively low energy demand. Thus, stationary generators and/or solar cells could be used to provide the local energy supply.

The method according to the invention allows also the use of conventional polystyrene foam concrete (expandable polystyrene foam-concrete) which is made of unheated polystyrene foam particles.

While the invention has been illustrated and described as embodied in a method of making an improved pavement, it is not intended to be limited to the details shown since various modifications and structural changes may be made without departing in any way from the spirit of the present invention.

What is claimed as new and desired to be protected by Letters Patent is set forth in the appended claims:

We claim:

1. A method of making a lightweight concrete of low thermal conductivity; comprising the steps of:
    subjecting a particulate polystyrene foam to thermal shock treatment at a temperature from 500° C. to 800° C. to effect a surface melting of the particulate polystyrene foam;
    blending cement paste comprised of cement and water with the thus-treated particulate polystyrene foam to form a mixture; and
    allowing the mixture to harden.

2. The method of claim 1 wherein the particulate polystyrene foam is made by crushing waste of polystyrene foam.

3. The method of claim 1 wherein the particles of polystyrene foam are crushed to a mean diameter of 5 to 30 mm.

4. The method of claim 1 wherein said blending step includes mixing the particles of polysterene foam with cement and water at a ratio of 1000 liters: 250 kg: 110 liters.

5. The method of claim 1, and further comprising the step of coating the thermal shock treated particles of polystyrene foam with a thin layer of cement paste comprised of cement and water to form a dry particulate aggregate for subsequent in situ preparation with additional cement paste.

6. The method of claim 1 wherein the particulate polystyrene foam is made by foaming of particulate polystyrene.

7. A method of making a lightweight concrete of low thermal conductivity; comprising the steps of:
    subjecting particles of polystyrene foam to a thermal shock treatment at a temperature to effect a surface melting of the particulate polystyrene foam;
    coating the thus-treated particles of polystyrene foam with a thin layer of cement paste comprised of cement and water;
    forming a dry particle material from the coated particles of polystyrene foam;
    mixing the dry particle material in situ with cement paste for formation of a mixture; and
    allowing the mixture to harden.

8. The method of claim 7 wherein the particulate polystyrene foam is made by crushing waste of polystyrene foam.

9. The method of claim 7 wherein said mixing step includes free fall mixing of the coated particles of polystyrene foam with cement paste.

10. The method of claim 7 wherein the particles of polystyrene foam are crushed to a mean diameter of 5 to 30 mm.

11. The method of claim 7 wherein the thermal shock treatment is effected by subjecting the particulate polystyrene foam to hot combustion gases at a temperature from 500° C. to 800° C.

12. The method of claim 7 wherein the particles of polysterene foam are mixed with cement and water at a ratio of 1000 liters: 250 kg: 110 liters.

13. The method of claim 7 wherein the particulate polystyrene foam is made by crushing refuse of polystyrene foam.

14. The method of claim 7 wherein the particulate polystyrene foam is made by foaming of particulate polystyrene.

15. A lightweight concrete for use as heat insulation course of a pavement, said lightweight concrete being produced by:

subjecting particles of polystyrene foam to a thermal shock treatment at a temperature to effect a surface melting of the particulate polystyrene foam;

coating the thus-treated particles of polystyrene foam with a thin layer of cement paste comprised of cement and water;

forming a dry particle material from the coated particles of polystyrene foam;

mixing the dry particulate material in situ with cement paste for formation of a mixture; and allowing the mixture to harden.

16. The method of claim 15 wherein the particulate polystyrene foam is made by crushing refuse of polystyrene foam.

17. The method of claim 15 wherein the particulate polystyrene foam is made by foaming of particulate polystyrene.

* * * * *